# 3,165,507
WATER-INSOLUBLE YELLOW MONOAZO-DYESTUFF

Oskar Braun and Gottfried Bandel, Frankfurt am Main, and Ernst-August Theiling, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Dec. 11, 1961, Ser. No. 158,589
Claims priority, application Germany, Dec. 16, 1960, F 32,773
1 Claim. (Cl. 260—193)

The present invention relates to a new valuable water-insoluble yellow monoazo-dyestuff and to a process for preparing it. In particular it relates to a dyestuff of the following formula

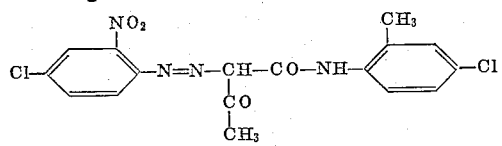

In the printing ink industry, the water-insoluble yellow monoazo-dyestuffs based on the coupling products of diazotized nitranilines or toluidines with acetoacetic anilides, which have been used for a long time for the preparation of yellow printing inks, have been replaced to an increasing extent by the water-insoluble yellow disazo-dyestuffs based on benzidine which are less fast to light but exhibit a much higher tinctorial strength, since the tinctorial strength of the abovementioned known yellow monoazo-dyestuffs has been unsatisfactory. The known yellow disazo-dyestuffs on the basis of benzidine, however, have the great disadvantage that they show a very high oil absorption which limits the preparation of yellow printing inks of high tinctorial strength, since the high oil absorption causes a poor flowability occurring especially with printing inks having a high content of pigment. In the printing ink industry there are, therefore, required yellow monoazo-dyestuffs of the conventional type which possess a high tinctorial strength. Furthermore, it is desirable that these yellow pigment dyestuffs posses greenish tints and that they yield prints of high brilliancy as compared with the hitherto known dyestuffs of this type.

In British Patent No. 587,259 is disclosed a process for the manufacture of yellow water-insoluble monoazo-dyestuffs, wherein diazotized nitraniline or its diazotized substitution products containing halogen atoms, alkyl or alkoxy groups are coupled with 1-(acetoacetylamino)-2-methyl-3-chlorobenzene.

We have found that a new yellow water-insoluble monoazo-dyestuff having excellent tinctorial properties is obtained by diazotizing 1-amino-2-nitro-4-chlorobenzene and coupling the diazo compound with 1-(acetoacetylamino)-2-methyl-4-chlorobenzene. The coupling is preferably carried out in the presence of a surface-active agent. As suitable surface-active agents the following compounds may be used, for example:

Anion-active products, such as the salts of alkylsulfamido-acetic acids of high molecular weight which may contain small amounts of hydrocarbons of high molecular weight, or salts of alkylnaphthalene sulfonic acids, furthermore, cation-active products, for example quaternary ammonium salts, such as dimethylbenzyl-dodecylammonium chloride, or esters of fatty acids and alkylolamines, such as the monoester of triethanolamine and oleic acid, and also non-ionic products, such as fatty alcohol polyglycol ethers, alkylnaphtholpolyglycol ethers or fatty acid polyglycol esters.

The yellow monoazo-dyestuff obtainable by the process of the present invention is distinguished by a greenish yellow tint. The printing inks prepared with the dyestuff possess a high tinctorial strength and a very good flowability. Furthermore, the prints produced with this dyestuff are distinguished by a high brilliancy and an improved transparency.

It is remarkable that the novel monoazo-dyestuff shows a considerably improved transparency as compared with the hitherto known greenish yellow dyestuffs of this type and that prints of high brilliancy can be produced, whereas among the known yellow monoazo-dyestuffs of this type no product has hitherto been found which enables the preparation of prints having a high brilliancy.

It is especially surprising that the monoazo-dyestuff obtainable by this invention is distinctly superior with regard to the dyeing properties to the isomeric dyestuff described in Example 1 of British Patent No. 587,259, which is obtained by coupling diazotized 1-amino-2-nitro-4-chlorobenzene with 1-(acetoacetylamino)-2-methyl-3-chlorobenzene. As compared with the known isomeric dyestuff described in the British patent cited above the novel monoazo-dyestuff is distinguished by a clearer tint, a considerably more greenish shade, a better fastness to light, a better fastness to solvents, an essentially higher brilliancy and a considerably higher transparency of the prints prepared with it.

The following example serves to illustrate the invention but it is not intended to limit it thereto, the parts being by weight unless otherwise stated, and the relationship of parts by weight to parts by volume being the same as that of the kilogram to the liter.

Example 172.5 parts of 2-nitro-4-chloroaniline are stirred with 700 parts by volume of water and 600 parts by volume of 5 N-hydrochloric acid, then cooled with ice to 0° C. and diazotized with 131 parts by volume of a sodium nitrite solution of 40% by weight.

The clarified diazo solution is then run at 15° C. in the course of 1½ to 2 hours, while stirring well, into an acetic acid suspension of the coupling component.

The suspension of the coupling component is prepared in such a manner that 234 parts of 1-(acetoacetylamino)-2-methyl-4-chlorobenzene are introduced into 5000 parts of water and dissolved with 53 parts of sodium hydroxide. After the addition of an aqueous emulsion of 10% by weight of 12 parts of the sodium salt of an alkylsulfamidoacetic acid obtained by semisulfochlorination of a hydrocarbon fraction with a boiling point in the range of 220° C. to 320° C., which still contains small quantities of non-reacted hydrocarbons, the coupling component is precipitated by running in a mixture of 175 parts of acetic acid and 175 parts of water. 160 parts of crystallized sodium acetate are then added.

When the coupling is complete, the dyestuff is filtered off, washed until neutral and dried.

We claim:
The monoazo-dyestuff of the formula

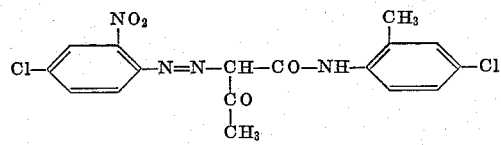

References Cited in the file of this patent
UNITED STATES PATENTS

| 1,644,003 | Wagner et al. | Oct. 4, 1927 |
| 2,112,764 | Dahlen et al. | Mar. 29, 1938 |
| 2,374,064 | Woodward | Apr. 17, 1945 |